(12) United States Patent
Williams

(10) Patent No.: US 8,497,590 B2
(45) Date of Patent: Jul. 30, 2013

(54) SPRING GENERATOR

(76) Inventor: James Williams, Sulphur, OK (US)

( * ) Notice: Subject to any disclaimer, the term of this patent is extended or adjusted under 35 U.S.C. 154(b) by 427 days.

(21) Appl. No.: 12/916,303

(22) Filed: Oct. 29, 2010

(65) Prior Publication Data

US 2011/0101702 A1    May 5, 2011

Related U.S. Application Data

(60) Provisional application No. 61/257,577, filed on Nov. 3, 2009.

(51) Int. Cl.
*F02B 63/04* (2006.01)

(52) U.S. Cl.
USPC .............................................. 290/1 E; 290/10

(58) Field of Classification Search
USPC . 290/1 C, 1 E, 1 R, 1 A; 360/96.3; 310/75 A, 310/112, 113, 68 B, 339
See application file for complete search history.

(56) References Cited

U.S. PATENT DOCUMENTS

| | | | |
|---|---|---|---|
| 2,389,514 A * | 11/1945 | Kennedy | 310/75 A |
| 4,287,428 A | 9/1981 | Smith | |
| 4,494,024 A | 1/1985 | Braun | |
| 5,517,469 A | 5/1996 | Wiget | |
| 5,552,973 A | 9/1996 | Hsu | |
| 5,668,414 A | 9/1997 | Takahashi et al. | |
| 5,880,532 A * | 3/1999 | Stopher | 290/1 E |
| 5,917,310 A | 6/1999 | Baylis | |
| 5,923,619 A | 7/1999 | Knapen et al. | |
| 6,523,646 B1 * | 2/2003 | Gates | 185/37 |
| 6,707,191 B1 | 3/2004 | Bye | |
| 6,924,571 B2 | 8/2005 | Bye | |
| 2004/0007427 A1 * | 1/2004 | Chio | 185/38 |
| 2009/0152867 A1 * | 6/2009 | Cripps | 290/42 |

* cited by examiner

*Primary Examiner* — Tulsidas C Patel
*Assistant Examiner* — Viet Nguyen
(74) *Attorney, Agent, or Firm* — Dale J. Ream

(57) ABSTRACT

A spring operated generator includes a pair of torsion spring banks and a pair of elongate shafts extending through respective spring banks and operatively connected to respective generators. A starter motor is connected to each respective spring bank for initially winding each spring bank. When actuated, the primed spring bank is allowed to unwind. A clutch coupled to the elongate shaft is configured to engage a respective generator, transferring energy from shaft rotation to the generator which produces electricity. As one spring bank unwinds, the other spring bank is wound in like manner as the first. When the initial spring bank is unwound and the other spring bank is sufficiently wound, the cycle is repeated, thereby causing the other generator to produce electricity.

7 Claims, 5 Drawing Sheets

SPRING GENERATOR

CROSS-REFERENCE TO RELATED APPLICATIONS

The present invention claims the benefit of U.S. Provisional Patent Application, Ser. No. 61/257,577, filed on Nov. 3, 2009 titled SPRING GENERATOR.

BACKGROUND OF THE INVENTION

This invention relates generally to a spring operated generator and, more particularly, to a spring arrangement that operates a generator to generate electricity as each spring unwinds. The spring may again be wound with a starter motor using a portion of electricity generated and stored as a result of the spring unwinding. Preferably, two spring generators are utilized together so that one spring generator is being wound while the other is generating electricity.

The production of energy and, particularly, electricity is very important in our world today due to all the modern conveniences that people consider mandatory or commonplace. Houses are growing larger and require more electricity for operating lights, appliances, and the like. Businesses require an ever larger amount of energy. And, of course, many smaller devices require smaller amounts of electrical power.

Various devices have been used or proposed in the past for producing electricity such as coal burning plants, hydroelectric systems that utilize flowing water to operate generators, the like. Although assumably effective for their intended purposes, the existing systems tend to be large, expensive, inefficient, or require use of large amounts of natural resources such as coal which has a negative environmental impact.

Therefore, it would be desirable to have a spring operated generator that operates a generator(s) having a torsion spring that operates the generator as it unwinds. Further, it would be desirable to have a spring operated generator that produces energy without causing a negative environmental impact. In addition, it would be desirable to have a spring operated generator that winds a spring using electricity stored while the spring unwinds.

SUMMARY OF THE INVENTION

A spring operated generator according to the present invention includes at least one electrical generator, at least one torsion spring bank, and at least one elongate shaft extending through respective spring banks and operatively connected to respective generators. A starter motor is connected to each spring bank for initially winding the spring bank. When actuated, the primed spring bank is allowed to unwind. A clutch coupled to the elongate shaft is configured to engage the respective generator, transferring energy from shaft rotation to the generator which produces electricity. Preferably, a pair of spring generators is provided together so that electricity is alternately produced by the pair. As the spring bank of the first spring generator unwinds, the other spring bank is wound in a similar manner as described above. When the initial spring bank is unwound and the other spring bank is sufficiently wound, the cycle is repeated, thereby causing the second generator to produce electricity. In this way, electricity may be generated continuously by a respective spring generator. An auxiliary power source may be connected to the battery for keeping it sufficiently charged in order to operate the starter motor initially or when the spring bank(s) need to be boosted. Auxiliary power may be a connection to traditional AC power, solar cells, wind energy, or the like.

Therefore, a general object of this invention is to provide a spring operated generator that utilizes at least one generator and two banks of springs to generate electricity.

Another object of this invention is to provide a spring operated generator, as aforesaid, that generates electricity without causing any negative environmental impact.

Still another object of this invention is to provide a spring operated generator, as aforesaid, that includes battery power to start an electricity generating cycle.

Yet another object of this invention is to provide a spring operated generator, as aforesaid, that is easy to operate and economical to manufacture.

A further object of this invention is to provide a spring operated generator, as aforesaid, that is portable.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
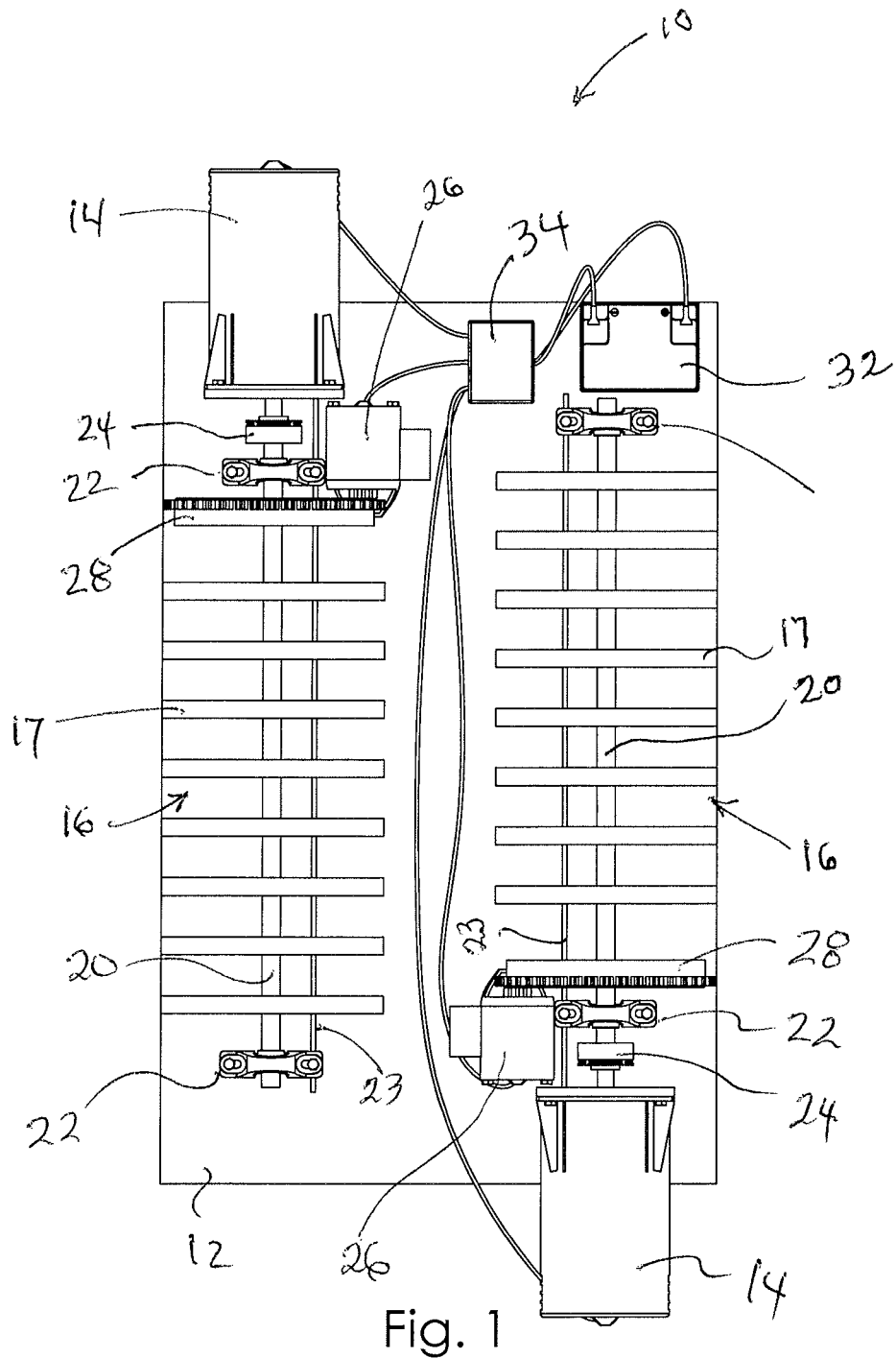
FIG. 1 is a top view of a spring operated generator according to a preferred embodiment of the present invention.
Figure 2:
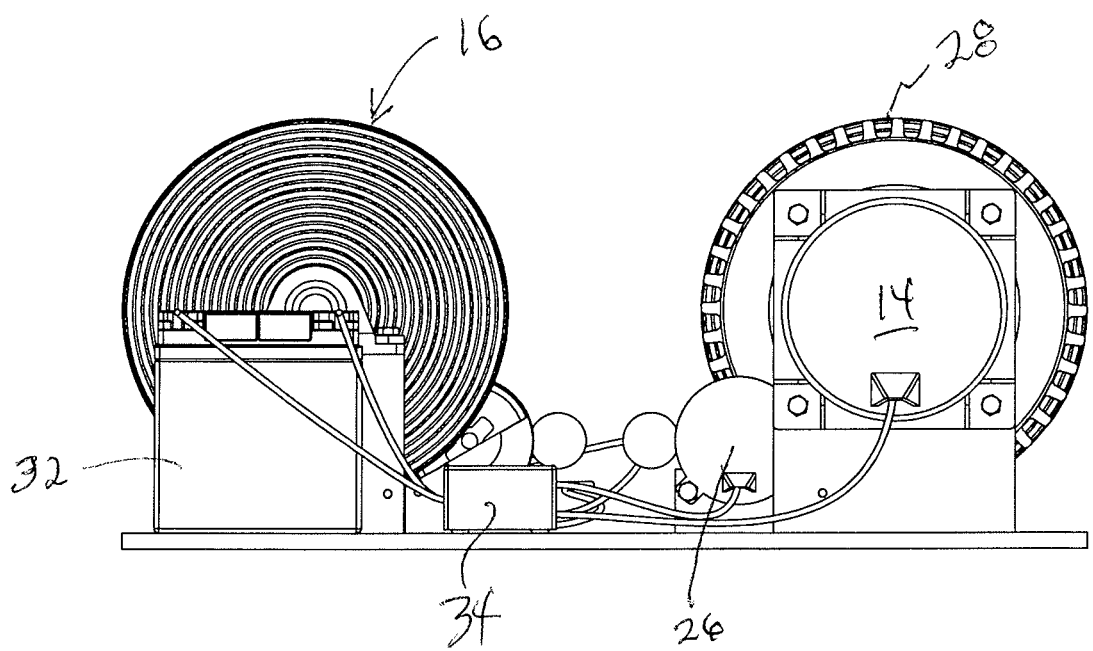
FIG. 2 is a end view of the spring operated generator of FIG. 1.
Figure 3:
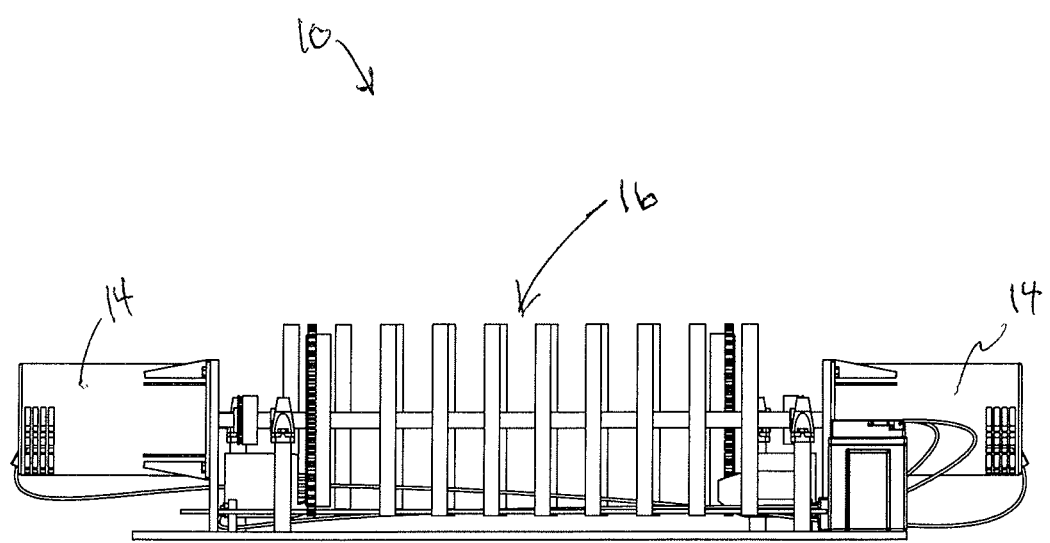
FIG. 3 is a side view of the spring operated generator of FIG. 1.
Figure 4:
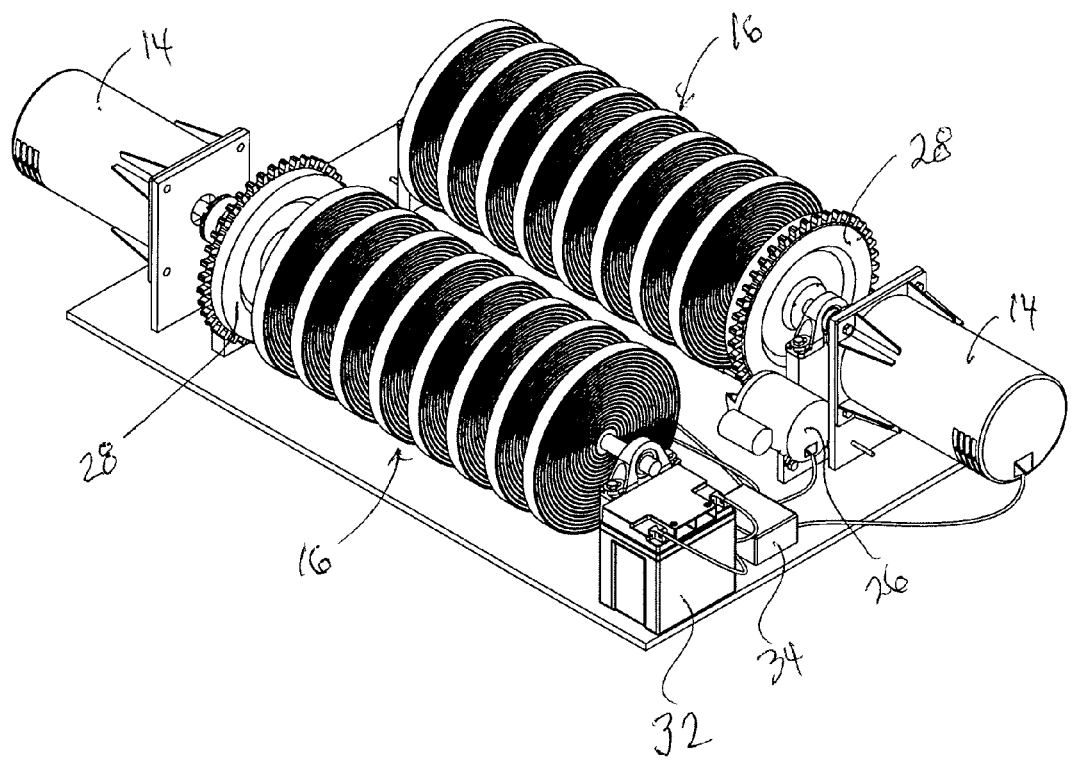
FIG. 4 is a rear perspective view of the spring operated generator of FIG. 1.

A spring operated generator 10 according to a preferred embodiment of the present invention will now be described in detail with reference to FIG. 1 to 5 of the accompanying drawings. The spring operated generator 10 may be a singular device or may include two completely individual devices mounted in close proximity to one another and electrically linked by a common controller 34, such that one operates to generate electricity at all times, as will be described more fully below. A pair of spring operated generators 10 is preferred and may be referred to in this application as a singular unit with the same reference numerals being used for each. In some instances, however, the pair of spring operated generators may be referred to separately (using the reference term "respective" or "respectively") so as to clearly explain the relationship of a pair of generators being operational relative to one another.

Figure 5:
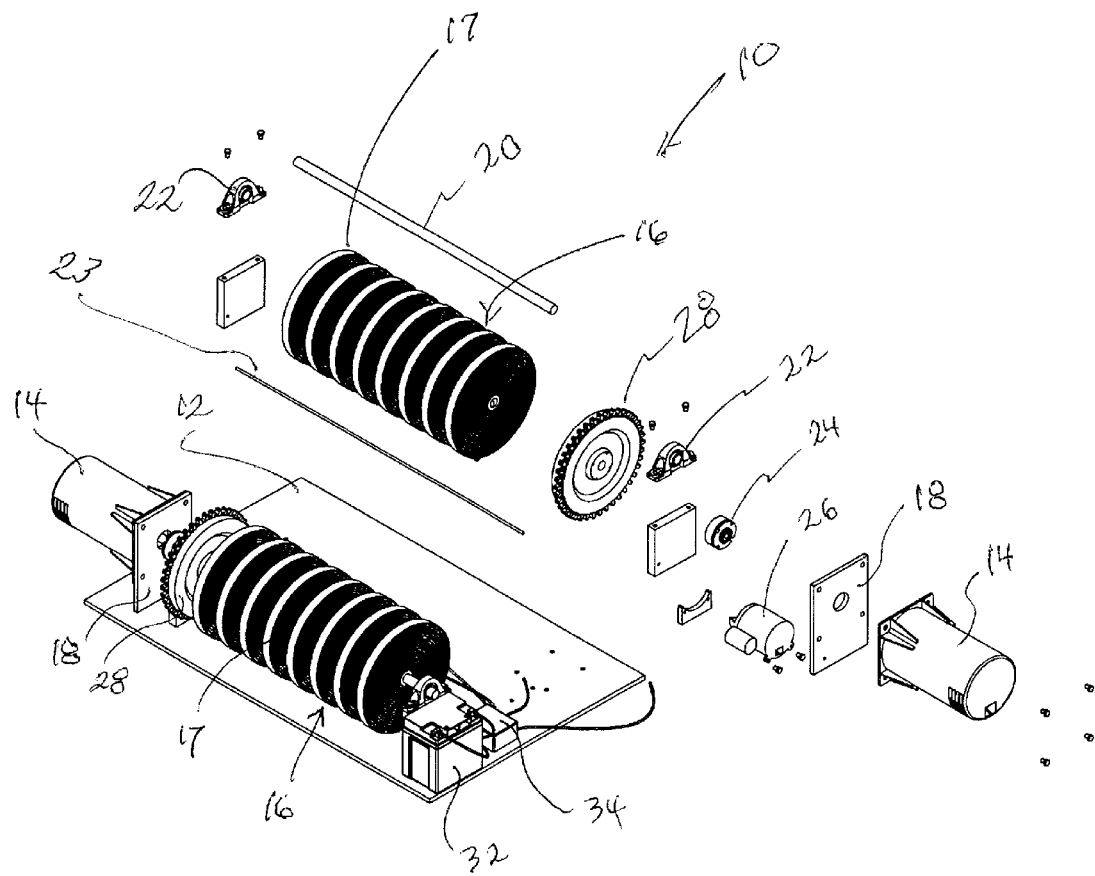
FIG. 5 is a partially exploded view of the spring operated generator

The spring operated generator 10 includes a base plate 12 to which all other components are mounted. The spring operated generator 10 includes a pair of spring banks 16 mounted to the base plate 12 with a mounting member 18 and operatively connected to the two generators 14, respectively (FIG. 5). Each spring bank 16 may include a plurality of torsion springs 17, each being connected to an adjacent spring in a serial configuration. Each spring bank 16 is movable between wound and unwound configurations. As will be discussed below, a respective spring bank 16 is either moving toward an unwound configuration or toward a wound configuration. It is understood that one spring bank is moving toward an unwound configuration when the other spring bank is moving toward a wound configuration. Alternatively, each spring bank 16 may include a single spring, although this configuration would require a relatively large spring. The spring generator 10 may include a pair of elongate primary shafts 20, each primary shaft 20 extending through a respective spring bank 16 and having a first end operatively attached thereto such that rotation of a respective primary shaft 20 either winds a respective spring bank 16 or is rotated automatically as the spring bank 16 unwinds, respectively. Another shaft 23, having a smaller diameter may extend through ends of each respective spring bank 16 for maintaining proper positioning. A pillow block bearing 22 supports each respective shaft 20, 23. Each primary shaft 20 includes a first end operatively connected to a respective spring bank 16 and an opposed second end operatively connected to a respective generator 14.

Each respective generator 14 and respective spring bank 16 combination includes a clutch 24 positioned between a spring bank 16 and generator 14, respectively, that operates to engage a respective generator 14 when the respective spring bank 16 is being unwound and which disengages from the respective generator when being wound, as will be described in more detail later.

The spring operated generator 10 includes a pair of starter motors 26, flywheels 28, and gear sets that cooperate to wind a respective spring bank 16. A starter motor 26 is operatively connected to a first end of a respective primary shaft 20. A respective starter motor 26 may be electrically connected to a battery 32 for powering an initial windup and to supply power if electricity generated by the generator 14 is insufficient to fully wind a spring bank 16. When actuated, a respective starter motor 26 causes a respective shaft 20 to wind an appropriate spring bank 16. A cycle of a spring unwinding is ready to begin (or to begin again) when a respective spring bank 16 is fully wound.

A control unit 34 may be electrically coupled to the clutches 24, the generators 14, the battery 32, and the starter motors 26 for regulating when a respective clutch 24 should engage and when the starter motor 26 should engage to impart the winding of a spring bank 16. The control unit 34 provides an operative link between the pair of spring banks 16 and generators 14. More particularly, the control unit 34 includes means for sensing whether one of the generators 14 is outputting sufficient energy (i.e. the generator 14 associated with the unwinding spring bank) to completely wind another of the spring banks (i.e. the winding spring bank). The control unit 34 may include electronics electrically connected to the generators 14 to measure an electrical voltage being output by each generator. Further, the control unit 34 may include a controller or processor configured, through programming or electronics, to activate a respective starter motor 26 to supply energy to rotate a respective primary shaft 20 so as to rewind/re-prime a respective spring bank 16. If, however, a respective generator 14 is producing sufficient electrical energy to rewind another of the spring banks, then energy may be diverted from the generator to the appropriate primary shaft 20 (i.e. the shaft 20 associated with the spring bank 16 that is not unwinding) to rewind the other respective spring bank 16. In summary, the control unit 34 actuates one respective spring bank to move toward said wound configuration while another respective spring bank moves toward said unwound configuration.

In an embodiment having only a single spring bank 16, electricity generated by the generator 14 may be used to wind an unwound spring bank 16. Or, if the generator 14 lacks sufficient energy to "re-prime" the spring bank 14, then the controller activates the starter motor 26 to activate the primary shaft 20 to wind the spring bank 16.

It is understood that an auxiliary power source (not shown) may be electrically connected to the battery 32 for keeping it sufficiently charged in order to operate the starter motors 26 initially or when the spring bank(s) 16 needs to be boosted. Auxiliary power may be provided by electrical connection to traditional AC power, solar cells, wind energy, or the like.

In use, a starter motor 26 is actuated to initially wind one spring bank 16 as described above and then the electricity generation cycle may be started. More particularly, the wound spring is allowed to unwind. As it unwinds, the clutch 24 enables the shaft 20 to engage the respective generator 14. The generator 14, upon operation of a respective primary shaft 20, produces electricity that may be stored or transferred to power a machine. As the initially wound spring bank 16 unwinds, the other spring bank 16 is wound in the same manner as described previously relative to the first spring bank. As described above, this occurrence will occur as the controller senses enough energy being output by the unwinding spring bank 16 and diverts said energy to the primary shaft 20 associated with the spring bank 16 needing to be rewound. In other words, the control box 34 is able to sense when one spring bank 16 is sufficiently unwound and the other is wound, and then signals the process to be reversed. This cycle may be repeated multiple times so as to generate a significant amount of electricity. If a respective control box 34 senses that a respective spring bank 16 lacks sufficient energy to be used to fully wind a spring bank 16, it may actuate the starter motor 26 to once again wind the respective spring bank 16 to full capacity using electricity drawn from the battery 32.

Accordingly, the present invention provides one or more generators operated by the unwinding of at least one torsion spring bank and generates electricity to wind another spring bank repeatedly for continued operation. With a pair of spring operated generators operating in combination, electricity may be generated by the unwinding of one spring bank while the other is being wound.

It is understood that while certain forms of this invention have been illustrated and described, it is not limited thereto except insofar as such limitations are included in the following claims and allowable functional equivalents thereof.

The invention claimed is:

1. A spring operated generator, comprising:
    a pair of spring banks, each spring bank having a plurality of torsion springs each connected to an adjacent torsion spring in a serial configuration, said each spring bank being movable between wound and unwound configurations;
    a pair of primary shafts, each primary shaft having a first end operatively coupled to a respective spring bank that is rotated in a first direction when said respective spring bank is moving toward said unwound configuration;
    a pair of generators, each generator being operatively connected to a second end of a respective primary shaft, each said generator generating electricity when a respective spring bank is rotating said respective primary shaft in said first direction;
    a power source;
    a pair of startup motors, each startup motor being electrically connected to said power source and operatively connected to said first end of said respective primary shaft so as to rotate said respective primary shaft in a second direction when activated, said respective primary shaft operatively moving said respective spring bank toward said wound configuration when rotating in said second direction;
    a control unit electrically connected to said power source, said pair of startup motors, and said pair of generators, said control unit having means for sensing if one of said spring banks has enough energy to completely move another of said spring banks to said wound configuration;

wherein said control unit actuates one respective spring bank to move toward said wound configuration while another respective spring bank moves toward said unwound configuration.

2. The spring operated generator as in claim 1, said pair of spring banks, said power source, and said pair of startup motors are mounted atop a base plate.

3. The spring operated generator as in claim 1, wherein:
said means for sensing includes electronics in said control unit that measure a voltage being output by said pair of generators; and
said control unit includes a controller configured to activate said respective startup motor if said measured voltage being output by a respective generator is less than a predetermined voltage.

4. The spring operated generator as in claim 1, wherein said power source is a rechargeable battery.

5. The spring operated generator as in claim 1, further comprising an auxiliary power source electrically connected to said power source.

6. The spring operated generator as in claim 5, wherein said auxiliary power source is one of AC power, solar power, and wind energy.

7. The spring operated generator as in claim 1, further comprising a clutch operatively coupled to each said respective spring bank and to each said respective generator so as to engage said respective generator when said respective spring bank is moving toward said unwound configuration and to disengage said respective generator when said respective spring bank is moving toward said wound configuration.

* * * * *